I. L. VAN SCHOIACK.
SEED TESTER.
APPLICATION FILED MAY 2, 1913.

1,090,251.

Patented Mar. 17, 1914.
2 SHEETS—SHEET 1.

Witnesses
R. N. Jones
C. L. Laudow

Inventor
I. L. Van Schoiack
By ................... Jr.
Attorney

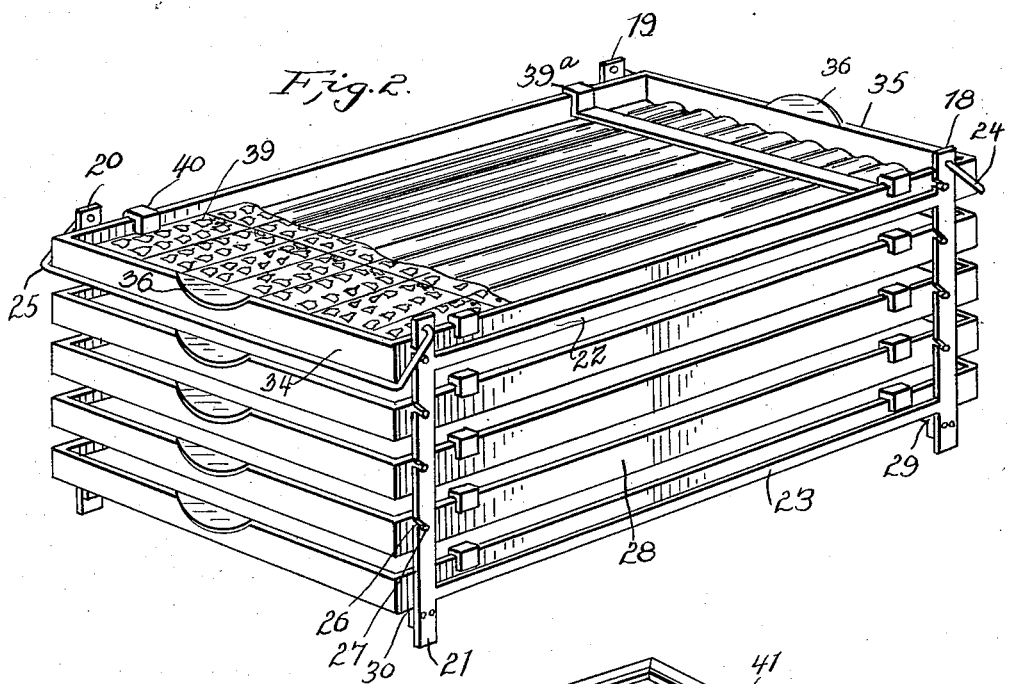

UNITED STATES PATENT OFFICE.

ISAAC L. VAN SCHOIACK, OF SUGAR GROVE, ILLINOIS.

SEED-TESTER.

1,090,251. Specification of Letters Patent. Patented Mar. 17, 1914.

Application filed May 2, 1913. Serial No. 765,097.

*To all whom it may concern:*

Be it known that I, ISAAC L. VAN SCHOI-ACK, a citizen of the United States, residing at Sugar Grove, in the county of Kane and State of Illinois, have invented certain new and useful Improvements in Seed-Testers; and I do hereby declare the following to be a full, clear, and exact description of the invention, such as will enable others skilled in the art to which it appertains to make and use the same.

This invention relates to new and useful improvements in seed testers, and, as its principal object, contemplates the provision of a seed cabinet in which seeds of all kinds may be deposited and subjected to a germinating process, thus enabling the planter to predetermine the vitality or germinating qualities of the seeds, insuring in this manner a maximum crop and economizing time and labor in the cultivation of the land.

A further object resides in the construction of the said cabinet with such regard to proportion, number and arrangement of parts that it may be cheaply manufactured, will be durable and efficient in its action, and will permit the operator to quickly remove the seed trays for the purpose of inspecting the seeds or removing them.

A still further object is to provide a novel heating lamp support, so constructed that the lamp may be readily swung from its normal position into a position which will permit access to the lamp for the purpose of refilling it with oil.

A yet further object is to subject the seeds to all possible germinating elements of nature, as well as artificial germination producing devices, by constructing the side walls and top of the cabinet of plate glass, thus permitting the entrance of sunlight to the interior of the cabinet.

An object of equal importance with the foregoing is to provide a novel form of absorbent pad for the seeds, which will enable the operator to readily identify the groups of seeds taken from various batches of the raw material.

The above and additional objects are accomplished by such means as are illustrated in the accompanying drawings, described in the following specification and then more particularly pointed out in the claims which are appended hereto and form a part of this application.

Figure 1:
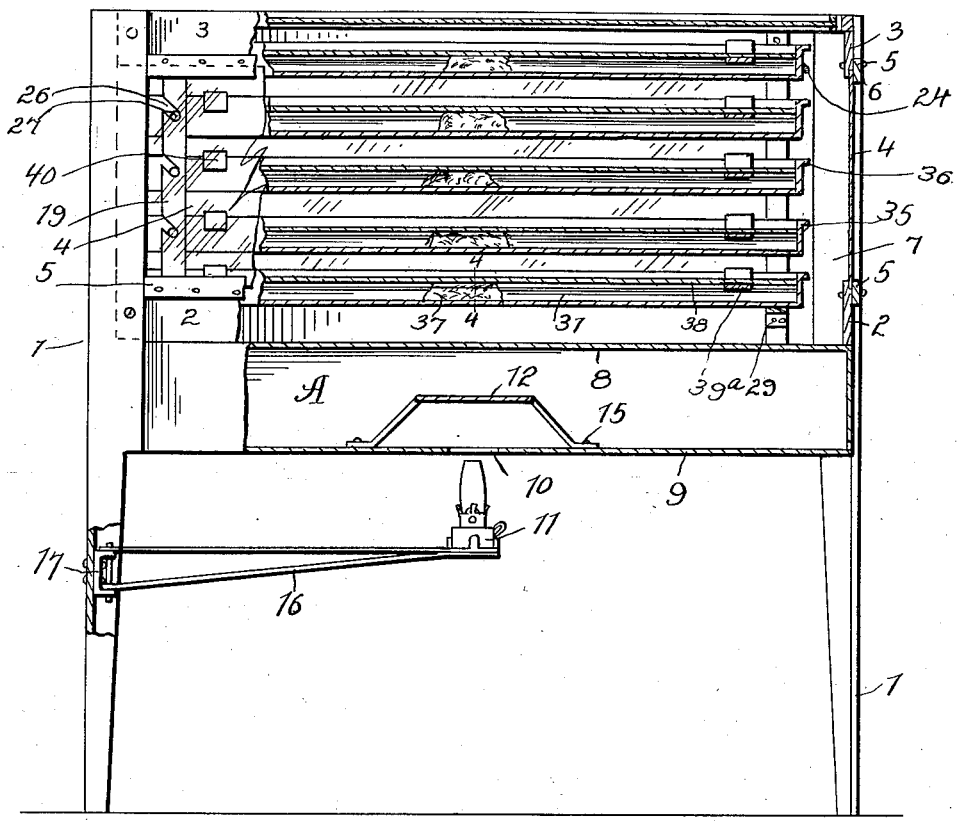
Figures 5, 6:
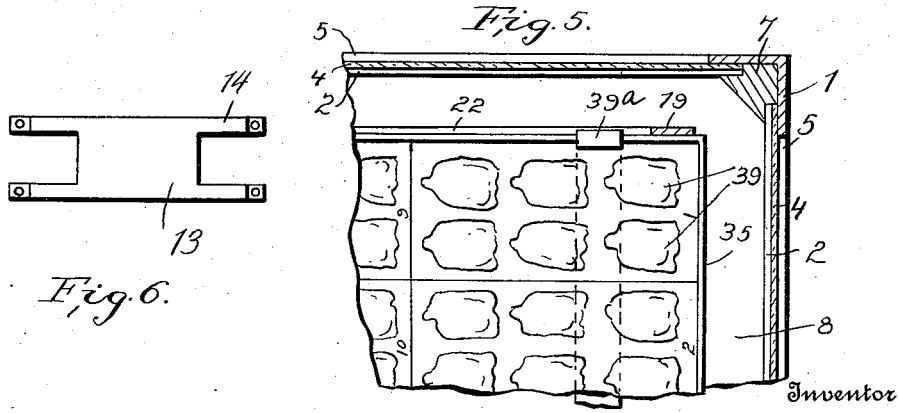

With reference to the drawings, wherein I have illustrated the preferred embodiment of my invention as it is reduced to practice, and throughout the several views of which similar reference numerals designate corresponding parts: Figure 1 is a side elevation of the cabinet with a portion of the side walls broken away to clearly illustrate the interior arrangement of the various seed trays and associated parts; Fig. 2 is a perspective view illustrating in detail the tray rack in disassembled relation to the cabinet; Fig. 3 is a perspective view of the glass cover for the cabinet containing the tray rack and seed trays; Fig. 4 is a section on the line 4—4 of Fig. 1; Fig. 5 is a section of one of the corners of the cabinet taken on a horizontal plane; Fig. 6 is a detail view of the baffle plate employed in effecting an even distribution of the heat.

Proceeding now to the description of the drawings, this invention includes three main elements, the cabinet, the tray rack, and the seed trays. Taking up these elements in the order named, the cabinet includes four angle iron supporting legs, one of which is designated in Fig. 5 by the numeral 1. Inasmuch as the construction of the two ends and sides of the cabinet is identical in each instance, it is deemed necessary to illustrate and describe in detail only one corner portion of the cabinet, particular reference being had, therefore, to Figs. 1 and 5. It will be observed, by reference to these figures, that the corner posts are connected by upper and lower interior plates 2 and 3. The plates 2 and 3 are each provided with a longitudinally extending recess at their lower edge, to receive the upper and lower longitudinal edges of a plate glass wall 4. A securing strip 5 may be bolted, or otherwise secured as at 6, to each of the members 2 and 3, as illustrated in detail in Fig. 1, the obvious purpose of the strips 5 being to hold the glass in fixed position in the recesses formed in the members 2 and 3. The terminals of the plates 2 and 3 and of the glass 4 are arranged interiorly of the adjacent portion of the angle iron leg 1, as in Fig. 5, while the strips 5 terminate at the inner edge of the member 1, and are flush with the outer face thereof. A filler block 7 extends longitudinally of the member 1, and is cut away to hold the members 2, 3 and 4 in the assembled relation interiorly of the member 1.

At the lower edges of the glass members 4, and interiorly of the four legs of this invention, is secured a metallic shelf 8 which is horizontally disposed and is designed to support the tray rack, as will be hereinafter described. There is also provided a bottom wall 9 which is secured at its four corners to the legs of the cabinet, and is arranged in parallel spaced relation to the member 8, being provided with the centrally disposed aperture 10, through which the heat from the lamp 11, or other suitable heat source issues into the heating chamber, designated by the letter A, and formed between the members 8 and 9. A baffle plate 12, designed to distribute the heat evenly within the chamber A, is mounted over and spaced from the opening 10, and comprises essentially a body plate 13, equipped with angularly supporting legs 14, which are bolted or otherwise secured, as at 15, on the inner face of the member 9.

The lamp 11, which is the preferred form of heat source used in this invention, is mounted on the free end of a supporting bracket 16, the other terminal of which is pivotally secured, as at 17, to a leg of the cabinet, permitting the lamp 11 to be swung from beneath the member 9 and into a position at the side of the cabinet for the obvious purpose of enabling the operator to refill the lamp with oil at the necessary intervals.

Taking up as next in order, the tray rack of this invention, this feature includes four strap iron legs, designated in Fig. 2 by the numerals 18, 19, 20, and 21. Connecting the legs and operating to hold them in rigid assembled position are the upper and lower side frame members 22 and 23. A pair of these frame members connects the legs 18 and 21 and an additional pair connects the legs 19 and 20. A pair of bail handles 24 and 25 are respectively secured to the upper terminals of the supporting legs and are designed to permit the removal of the entire rack from the cabinet when so desired. Each leg member of this tray rack is formed with the spaced angularly, inwardly extending pin slots 26, which are designed to receive terminal pins 27, carried at each end of the side walls of the various seed trays, designated as entireties in Fig. 2, by the numeral 28. A pair of cross bars 29 and 30 connect the lower terminals of the legs 18 and 19 and 20 and 21.

Coming now to the detailed description of the seed trays: Since these features of the invention are uniform in their construction, it is, therefore, necessary to describe only one of the trays. In this connection, reference is had particularly to Figs. 2 and 4. Each tray includes a substantially rectangular box member, formed with a corrugated or fluted metallic bottom wall 31, side walls 32 and 33, and end walls 34 and 35. In the preferred embodiment, the members 31, 32, 33, 34 and 35 are stamped from a single sheet of metal.

As above described, a laterally extending pin 27 is secured to each terminal portion of the side walls 32 and 33 for the obvious purpose of permitting the trays to be removably mounted in the tray rack. Each end member 34 and 35 of the tray may be equipped with a suitable handle, which may be of the strap type, or any other suitable and desired form, as at 36. In each channel or flute of the member 31 is mounted an absorbent wick or strip 37, which may be formed of sponge or any other bibulous material.

In supporting the seeds within the trays, this invention employs an absorbent pad 38, which may be formed of ordinary blotting paper, or of any desired fabric, the selection of the material for this pad being purely an arbitrary matter, inasmuch as the only requirement is that the pad be of such a nature that it will absorb moisture from the sponges 37. The members 38 are provided with printed characters, designated at 39 in Fig. 2. These characters are preferably designed to illustrate corn seeds, or any other kind of grain which is to be tested. In printing these characters or spots, 39, they are preferably arranged in groups of six, each group being given a numeral or a letter. It will be apparent that by this design, the operator may select a group of seeds from each batch of grain to be tested, placing the seeds of one batch on the first group, and the next batch on the second group, and so on. By this method, the operator will be enabled to readily ascertain the vitality of the various batches of raw material.

In supporting the pads or absorbing sheets 38 in the desired position to the trays, there has been provided for each tray a pair of substantially U-shaped brackets 39$^a$ and 40, the free ends of the brackets being bent to produce hook members which engage the upper edge of the side walls 32 and 33 of the various trays.

The actual construction of the various features of this invention being thus disclosed, it now remains to describe the operation involved in the testing of the seeds. Briefly, it is as follows: The trays are removed from the rack by being first moved in a horizontal plane, to disengage the pins 27 from the receiving slots and being then lifted up and out of the cabinet. When the trays have been removed from the cabinet, the operator removes the seed pads 38 from each tray and soaks the absorbent pads or sponges with water. The members 38 are then replaced and the seeds are arranged on the sheets in the manner above described. After replacing the trays within the rack, the cover, which consists essentially in a frame 41, covered by a glass plate 42, is placed on the top of the cabinet. It then remains to light the lamp 11, and swing it into registering position with the opening 10. It will, of course, be apparent that the heat issuing into the chamber A will warm the bottom shelf 8, which is of metal, with a resultant raising of the temperature of the air space within the cabinet proper. The germination of the seeds is thus produced in the well known manner.

It is desirable to call attention to the fact that by employing glass side walls and the glass top, the sun light may enter the interior of the cabinet, thus aiding the process of germination. It will of course be understood that any desired heat source may be substituted for the member 11 without affecting the spirit of this invention.

Reference to the drawings will also make it apparent that the whole number of seed trays may be simultaneously removed from the cabinet by removing the tray rack by the handles 24 and 25, in the manner above noted.

In reduction to practice, I have found that the form of my invention, illustrated in the drawings and referred to in the above desciption, as the preferred embodiment, is the most efficient and practical; yet, realizing that the conditions concurrent with the adoption of my device will necessarily vary, I desire to emphasize the fact that various minor changes in details of construction, proportion, and arrangement of parts may be resorted to, when required, without sacrificing any of the advantages of my invention, as defined in the appended claims.

What is claimed is:

1. A seed tester including a transparent cabinet, a tray rack removably mounted therein, a plurality of seed trays removably mounted in said rack, a pair of spaced horizontally disposed plates arranged to form a heating chamber, and a heating lamp for said chamber, said tray rack including four supporting legs provided with angular slots, longitudinally extending connecting beams for said legs, laterally extending connecting beams for said legs, and a pair of bail handle members for said legs.

2. A seed tester including a transparent cabinet, a tray rack removably mounted therein, a heating lamp for said cabinet, and a plurality of seed trays removably mounted in said rack, each of said trays including a substantially rectangular box member having a corrugated bottom wall, absorbent wicks arranged in the corrugations, an absorbent sheet provided with grouped seed characters and adapted to support the seeds during the process of germination, and a pair of U-shaped supporting brackets for said seeds, said brackets being removably attached to the side walls of said box.

3. A seed tester comprising a cabinet, a tray rack mounted therein, a plurality of seed trays mounted in said rack, each of said seed trays having a corrugated bottom surface, absorbent wicks mounted in the corrugations, an absorbent seed supporting sheet, and means for supplying heat to said cabinet.

4. A seed tester including a transparent cabinet, a tray rack removably mounted therein, a heating lamp for said cabinet, and a plurality of seed trays removably mounted in said rack, means affording the removable mounting of said seed trays provided by said seed trays and tray rack, each of said trays comprising a substantially rectangular box member having a longitudinal corrugated bottom wall, absorbent wicks arranged in the corrugations, and an absorbent seed supporting sheet provided with grouped seed characters.

In testimony whereof I affix my signature in presence of two witnesses.

ISAAC L. VAN SCHOIACK.

Witnesses:
J. S. MILLER,
S. L. CLEVER.

---

Copies of this patent may be obtained for five cents each, by addressing the "Commissioner of Patents, Washington, D. C."